United States Patent
Chen

(10) Patent No.: US 8,146,154 B2
(45) Date of Patent: *Mar. 27, 2012

(54) METHOD AND SYSTEM FOR USING SHARED SECRETS TO PROTECT ACCESS TO TESTING KEYS FOR SET-TOP BOX

(75) Inventor: Xuemin Sherman Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/849,296

(22) Filed: Aug. 3, 2010

(65) Prior Publication Data

US 2010/0299750 A1 Nov. 25, 2010

Related U.S. Application Data

(63) Continuation of application No. 11/126,502, filed on May 11, 2005, now Pat. No. 7,770,219.

(51) Int. Cl.
*G06F 7/04* (2006.01)

(52) U.S. Cl. .................. 726/20; 726/17; 726/21; 726/9; 713/182; 713/183; 713/185; 713/189

(58) Field of Classification Search .................. None
See application file for complete search history.

(56) References Cited

U.S. PATENT DOCUMENTS

| | | | |
|---|---|---|---|
| 5,767,784 A | 6/1998 | Khamharn | |
| 6,182,214 B1 | 1/2001 | Hardjono | |
| 6,230,269 B1 | 5/2001 | Spies et al. | |
| 6,697,489 B1 | 2/2004 | Candelore | |
| 6,970,853 B2 | 11/2005 | Schutzer | |
| 7,047,551 B2 * | 5/2006 | Ogawa et al. | 725/141 |
| 7,231,526 B2 * | 6/2007 | Hon et al. | 713/185 |
| 7,383,570 B2 | 6/2008 | Pinkas et al. | |
| 7,492,897 B1 | 2/2009 | Eskicioglu et al. | |
| 2003/0046593 A1 | 3/2003 | Xie et al. | |

* cited by examiner

*Primary Examiner* — Pramila Parthasarathy
(74) *Attorney, Agent, or Firm* — Sterne, Kessler, Goldstein & Fox PLLC

(57) ABSTRACT

Certain aspects of a method and system for using shared secrets to protect the access of testing keys for a set-top box may comprise receiving within a security processor within a set-top box a plurality of secret keys from a plurality of users. A password may be generated utilizing secret sharing based on the received plurality of secret keys. The generated password may be compared with a generated response. The plurality of users may be authenticated access to the set-top box based on the comparison.

16 Claims, 5 Drawing Sheets

METHOD AND SYSTEM FOR USING SHARED SECRETS TO PROTECT ACCESS TO TESTING KEYS FOR SET-TOP BOX

CROSS-REFERENCE TO RELATED APPLICATIONS/INCORPORATION BY REFERENCE

This application is a continuation of U.S. application Ser. No. 11/126,502 filed on May 11, 2005.

FIELD OF THE INVENTION

Certain embodiments of the invention relate to security. More specifically, certain embodiments of the invention relate to a method and system for using shared secrets to protect access to testing keys for a set-top box.

BACKGROUND OF THE INVENTION

Test modes for modern set-top boxes (STBs) may be protected by a plurality of secure authentication mechanisms. Authentication mechanisms in a STB may be required to authenticate a single user or multiple users. In STB applications such as accessing system buses and interfaces, a user may need to provide specific information to enable the system to confirm its identity. The information may be in the form of passwords or responses by the user to the STB challenges.

One of the common approaches to authenticating a user identity is the use of passwords. For example, the user may provide a password, and the STB may validate the password. If the password is associated with the user, that user's identity may be authenticated. If the password is not associated with the user, the password may be rejected and the authentication may fail.

A common hidden unreadable value may be stored in a chip to generate the password. A secure passing algorithm, for example, an algorithm modified from advanced encryption standard (AES) may be adapted to protect the password from an attacker trying to guess it. The password scheme may be used for preventing unauthorized users to access security sensitive areas of a device, for example, observing and controlling test access ports (TAPs) on a software controlled basis. One of the problems associated with passwords are that they are reusable. If an attacker breaks a password, he may later reuse the password to gain access to other STBs. A set-top box (STB) may not be able to distinguish between an attacker and a legitimate user.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for using shared secrets to protect access to testing keys for a set-top box, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain aspects of a method and system for using shared secrets to protect the access of testing keys for a set-top box may comprise receiving within a security processor within a set-top box a plurality of secret keys from a plurality of users. A password may be generated utilizing secret sharing based on the received plurality of secret keys. The generated password may be compared with a generated response. The plurality of users may be authenticated access to the set-top box based on the comparison.

Figure 1A:
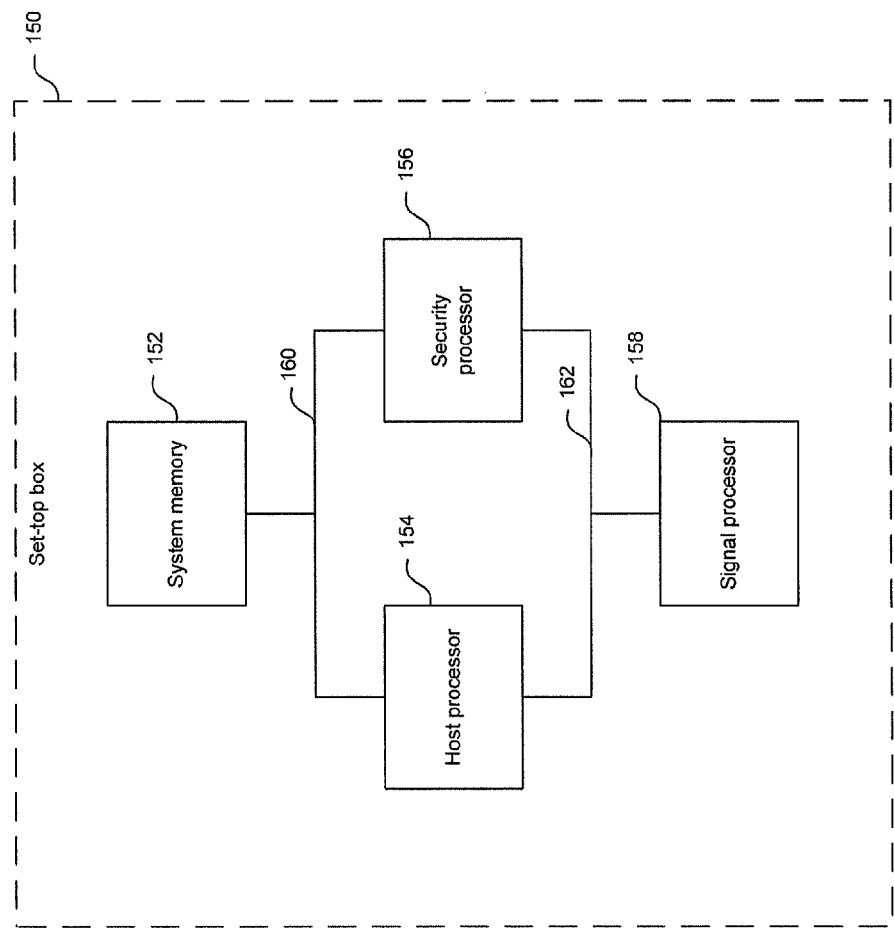
FIG. 1A is a block diagram illustrating an exemplary set-top box with a security processor, in accordance with an embodiment of the invention.

FIG. 1A is a block diagram illustrating an exemplary set-top box with a security processor, in accordance with an embodiment of the invention. Referring to FIG. 1A, there is shown a set-top box 150 that may comprise a host processor 154, a system memory 152, a security processor 156, a signal processor 158, a memory bus 160, and a data bus 162. The host processor 154 may comprise suitable logic, circuitry, and/or code that may be adapted to perform data processing and/or system control operations associated with the set-tip box 150. The host processor 154 may be adapted to communicate with the system memory 152 via, for example, the memory bus 160 and with the security processor 156 and/or the signal processor 158 via, for example, the data bus 162. The system memory 152 may comprise suitable logic, circuitry, and/or code that may be adapted to store data, control information, and/or operational information. The security processor 156 may comprise suitable logic, circuitry, and/or code that may be adapted to perform multiple security operations on data received by the set-top box 150. The security operations may include, but need not be limited to, non-volatile memory (NVM) security, key ladders, challenge-response authentication, memory data signature verification, secure scrambler configuration, and security assurance logic, for example. In this regard, the security processor 156 may comprise multiple security components to perform the features associated with the security operations. The signal processor 158 may comprise suitable logic, circuitry, and/or code that may be adapted to perform a plurality of processing operations on the data received by the set-top box 150. The set-top box may utilize at least one signal processor 158.

In operation, the security processor 156 may receive access requests from a user to perform a certain data operations within the set-top box 150. The security processor 156 may verify access rights or privileges that the user may have to a security component in the security processor 156 based on a stored access control matrix. The security processor 156 may determine whether access to a security component is provided independently of the host processor 154, that is, the security processor 156 may not operate as a slave to the host processor 154. When access to the security component is verified, the security processor 156 may perform the security feature or features associated with the security component. In some instances, the security processor 156 may transfer the results of the operations associated with the security component to, for example, the host processor 154 and/or the signal processor 158. Moreover, the security processor 156 may utilize information stored in the system memory 152 when performing certain security operations associated with security features.

Figure 1B:
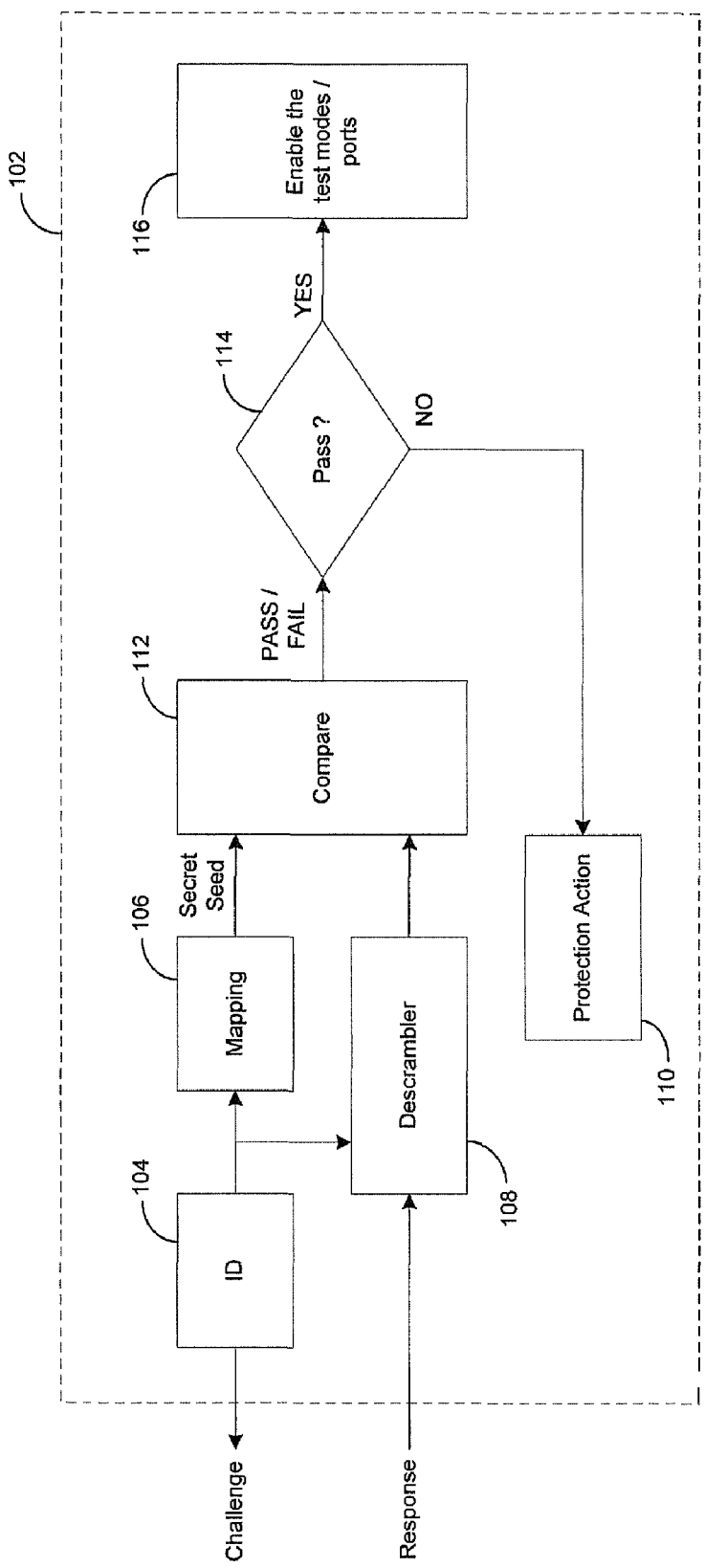
FIG. 1B is a block diagram illustrating a set-top box (STB) challenge-response process, in accordance with an embodiment of the invention.

FIG. 1B is a block diagram illustrating a set-top box (STB) challenge-response process, in accordance with an embodiment of the invention. Referring to FIG. 1B, there is shown a set-top box (STB) 102. The STB 102 may comprise a device ID block 104, a mapping block 106, a descrambler block 108, a protection action block 110, a compare block 112, a decision block 114 and an enable block 116.

The device ID block 104 may comprise suitable logic, circuitry and/or code that may be adapted to store a unique readable device ID. The mapping block 106 may comprise suitable logic, circuitry and/or code that may be adapted to store a table of values to map the unique device ID stored in the device ID block 104 and generate a corresponding secret seed. The descrambler block 106 may comprise suitable logic, circuitry and/or code that may be adapted to store a corresponding unique unreadable key to the unique device ID stored in the device ID block 104. The compare block 114 may comprise suitable logic, circuitry and/or code that may be adapted to compare the device ID stored in the device ID block 104 with its unique key stored in the descrambler block 108. In an alternative embodiment of the invention, the device ID stored in the device ID block 104 may be compared with its unique key stored in the descrambler block 108 by the STB 102. The enable block 116 may comprise suitable logic, circuitry and/or code that may be adapted to enable at least one of the test modes and/or the test access ports. In an alternative embodiment of the invention, at least one of the test modes and/or the test access ports may be enabled by the STB 102. The protection action block 110 may comprise suitable logic, circuitry and/or code that may be adapted to reject a user from accessing the set-top box 102 if authentication fails.

If the device ID stored in the device ID block 104 matches with its corresponding unique key stored in the descrambler block 108, control passes to the enable block 116. The enable block 116 may be adapted to enable at least one of the test modes and/or the test access ports. If the device ID stored in the device ID block 104 does not match with its corresponding unique key stored in the descrambler block 108, authentication may fail and control passes to the protection action block 110. The protection action block 110 may be adapted to reject a user from accessing the set-top box 102 if authentication fails.

The set-top box 102 may be adapted to have an n-bit, for example, 64-bit unique readable device ID block 104 and a corresponding unique unreadable key in the descrambler block 108, both of which may be known to an authorizing entity. The unique device ID stored in the device ID block 104 and its corresponding key stored in the descrambler block 108 may be utilized to authenticate the STB 102. In order to keep the key value hidden, only the device ID stored in the device ID block 104 generating the challenge may be readable. The compare block 112 may be adapted to compare the device ID stored in the device ID block 104 with its unique key stored in the descrambler block 108 for a given STB 102, using a table of values stored in the mapping block 106 known only to the authorizing entity to generate a response. The response may be utilized as the unique password for the STB 102 to access security sensitive areas or functions of the device. For example, to observe and control test access ports (TAPs) on a software controlled basis.

Figure 2A:
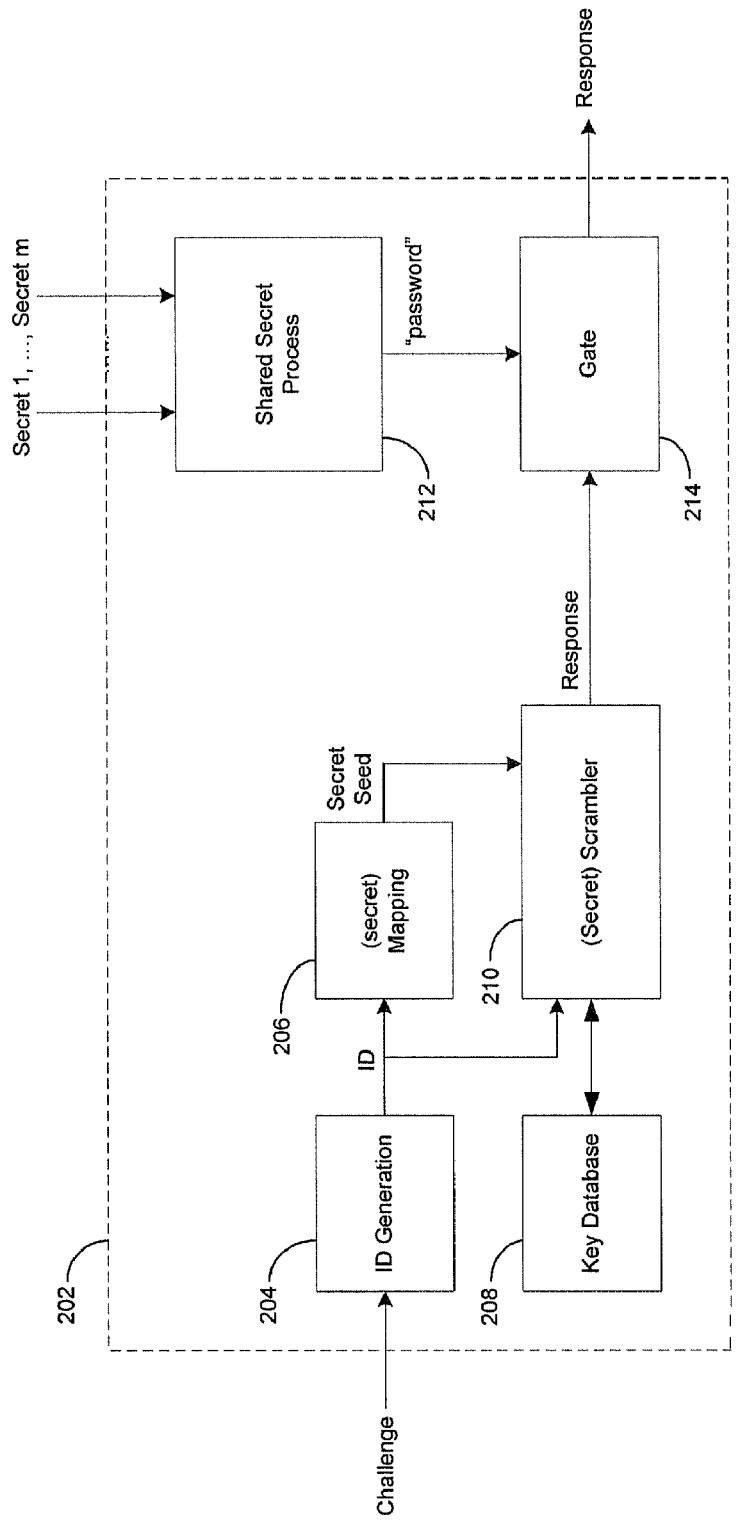
FIG. 2A is a block diagram illustrating the generation of a response using a testing key database, in accordance with an embodiment of the invention.

FIG. 2A is a block diagram illustrating the generation of a response using a testing key database, in accordance with an embodiment of the invention. Referring to FIG. 2A, there is shown a set-top box (STB) 202. The STB 202 may comprise an ID generation block 204, a mapping block 206, a key database 208, a scrambler 210, a shared secret process block 212 and a gate block 214.

The ID generation block 204 may comprise suitable logic, circuitry and/or code that may be adapted to generate and/or read a unique readable device ID. The mapping block 206 may comprise suitable logic, circuitry and/or code that may be adapted to store a table of values to map the unique device ID generated by the ID generation block 204 and generate a corresponding secret seed. The key database 208 may comprise suitable logic, circuitry and/or code that may be adapted to store a plurality of keys corresponding to a plurality of unique device ID's. The scrambler 210 may comprise suitable logic, circuitry and/or code that may be adapted to receive at least one the key from the key database 208 and at least one of: the device ID from the ID generation block 204 and the corresponding secret seed from the mapping block 206. The scrambler 210 may be adapted to generate a response by scrambling the key received from the key database 208 and at least one of: the device ID from the ID generation block 204 and the corresponding secret seed from the mapping block 206. The shared secret process block 212 may comprise suitable logic, circuitry and/or code that may be adapted to receive a plurality of secret keys, for example, secret keys 1 . . . m, if there are m parties that require access to the key database 208. The shared secret process block 212 may be adapted to generate a password to the gate block 214. The gate block 214 may comprise suitable logic, circuitry and/or code that may be adapted to compare the password received from the shared secret process block 212 and the response received from the scrambler block 210 and generate a response based on the comparison.

The shared secret process block 212 may be adapted to implement the principle of separation of privilege. In this regard, A (m, n) threshold scheme is a cryptographic process in which a password may be divided into n parts, any m of which may be sufficient to determine the original password. The n parts may be referred to as shadows. For example, in a (3, 5) threshold scheme, a secret sharing algorithm based on Lagrange interpolating polynomials may be used as the cryptographic process. A polynomial g(x) of degree 2 may be selected, where g(1) may be the secret password value. The shadows of the polynomial may be evaluated at {0,2,3,4,5}. By the laws of polynomial evaluation, at least 3 values are required to re-derive the polynomial, as the degree of the polynomial is 2. For example, let $g(x)=(g_2x^2+g_1x+g_0) \bmod q$, where $g_2=1, g_1=2, g_0=3$ and $q=7$. The secret password may be calculated as $g(1)=6$. The 5 shadows may be calculated as $g(0)=3, g(2)=4, g(3)=4, g(4)=6$ and $g(5)=3$.

Each shadow may be given to a different party, for example, a chip vendor, a box manufacturer or a database manager. To recover the polynomial, any 3 shadows may be interpolated. The interpolated polynomial may be represented by the following equation:

$$g(x) = \sum_{i=1}^{m} g(x_i) \prod_{j=1, j \neq i}^{m} \frac{x - x_j}{x_i - x_j} \bmod q \text{ where } x_i \in \{0, 2, 3, 4, 5\}.$$

In accordance with an embodiment of the invention, shadow access may be limited to particular users, for example, access to shadow 0 may be limited to the service provider, access to shadow 3 may be limited to the STB manufacturer and the access to shadow 5 may be limited to the chip vendor. The secret password for debugging the chip may be recomputed as follows:

$x_1=0$, $x_2=3$ and $x_3=5$. Accordingly, $g(x_1)=3$, $g(x_2)=4$ and $g(x_3)=3$.

$$g(x) = \begin{pmatrix} 3 \cdot \frac{(x-3)(x-5)}{(0-3)(0-5)} + \\ 4 \cdot \frac{(x-0)(x-5)}{(3-0)(3-5)} + \\ 3 \cdot \frac{(x-0)(x-3)}{(5-0)(5-3)} \end{pmatrix} \bmod 7.$$

The Lagrange polynomial may be calculated as $g(x)=x^2+2x+3 \bmod 7$. The secret password may be calculated as $g(1)=6$. For a given unique ID, the three parties may generate the response by using their shadows, for example, $g(x_1)=3$, $g(x_2)=4$ and $g(x_3)=3$. The response may be used to enable functions such as test modes and test access ports for debugging. Notwithstanding, other polynomial functions and algorithms may be utilized to calculate the password.

The enabling of the test modes or test access ports may be protected by a challenge-response mechanism. The response for enabling the test modes or test access ports of the STB 202 may be utilized for debugging. For example, a STB 202 returned from the field may be debugged and may be accessible by required parties such as the chip vendor, box manufacturers and database managers. In accordance with an embodiment of the invention, a system for using shared secrets among the required parties to protect the access of the testing key database may be provided.

A plurality of parties may be involved in security for the STBs deployed in the field. For example, the service provider, a conditional access technology provider, multiple STB manufacturers and a chip vendor. All these parties may not be required to access the testing key database 208. In accordance with an embodiment of the invention, a method for constructing a control mechanism may be provided that may be adapted to allow any m out of n parties, where m<n, to gain access to the testing key database 208.

Figure 2B:
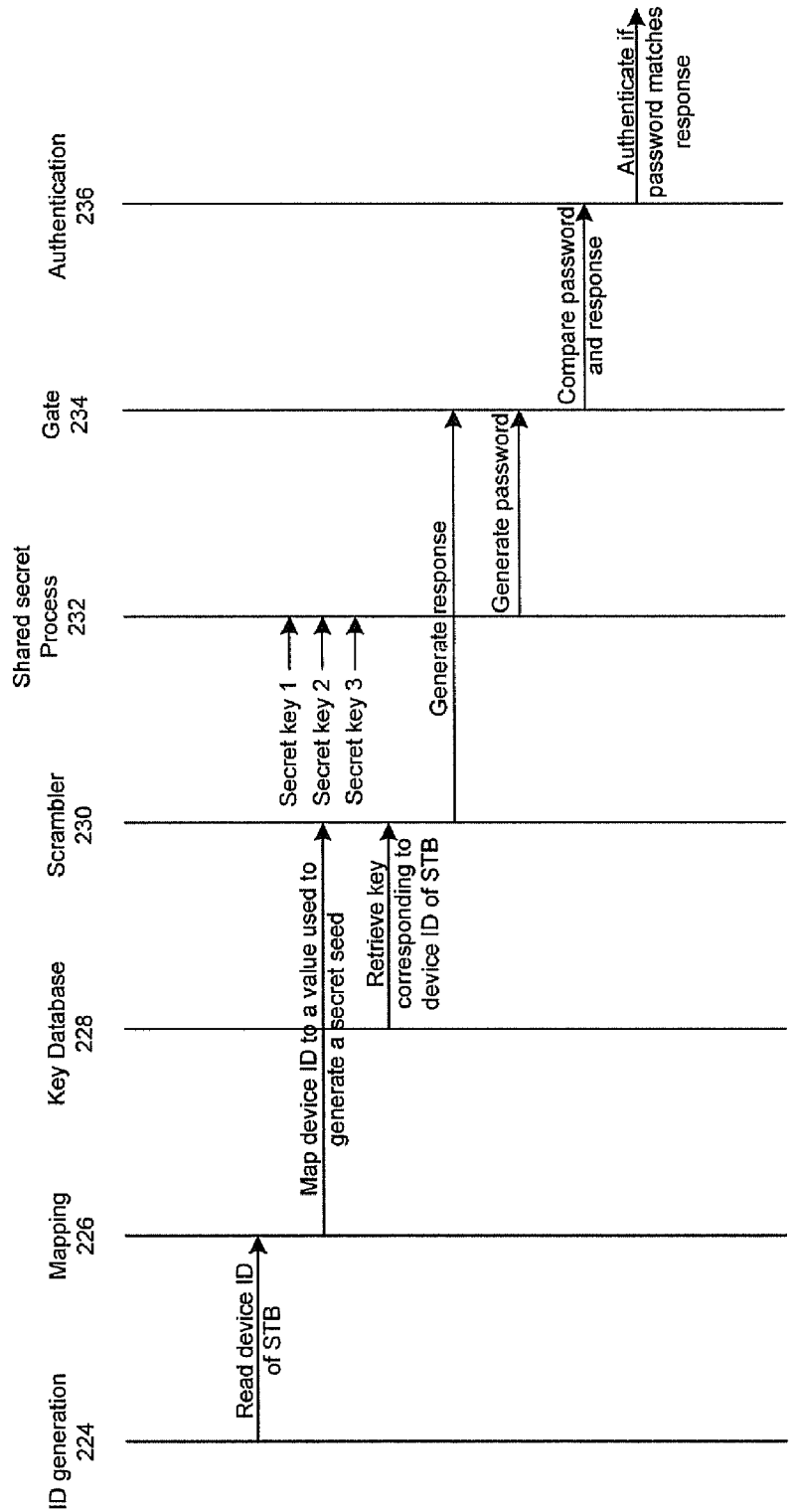
FIG. 2B is a flow diagram illustrating a method for using shared secrets to protect the access of testing keys for set-top box, in accordance with an embodiment of the invention.

FIG. 2B is a flow diagram illustrating a method for using shared secrets to protect the access of testing keys for set-top box, in accordance with an embodiment of the invention. Referring to FIG. 2B, there is shown a plurality of nodes ID generation 224, mapping 226, key database 228, scrambler 230, shared secret process 232, gate 234 and authentication 236. At the node ID generation 224, the unique device ID of a set-top box may be generated or read. At the node mapping 226, a table of values may be stored to map the unique device ID generated and a corresponding secret seed may be generated. At the node key database 228, the key corresponding to the unique device ID of the set-top box may be retrieved. At the node scrambler 230, the key from the node key database 228 and at least one of: the device ID from the node ID generation 224 and the corresponding secret seed from the node mapping 226 may be received. At the node scrambler 230, a response may be generated by scrambling the key received from the node key database 208 and at least one of: the device ID from the node ID generation 224 and the corresponding secret seed from the node mapping 226. At the node shared secret process 232, a plurality of secret keys may be received from users, for example, secret keys 1 . . . m, if there are m parties that require access to the node key database 228. At the node shared secret process block 232, a password may be generated to the node gate 234. At the node gate 234, the password received from the node shared secret process block 232 and the response received from the node scrambler 230 may be compared. At the node authentication 236, the plurality of users may be authenticated to access the set-top box if the generated password matches the generated response.

Figure 3:
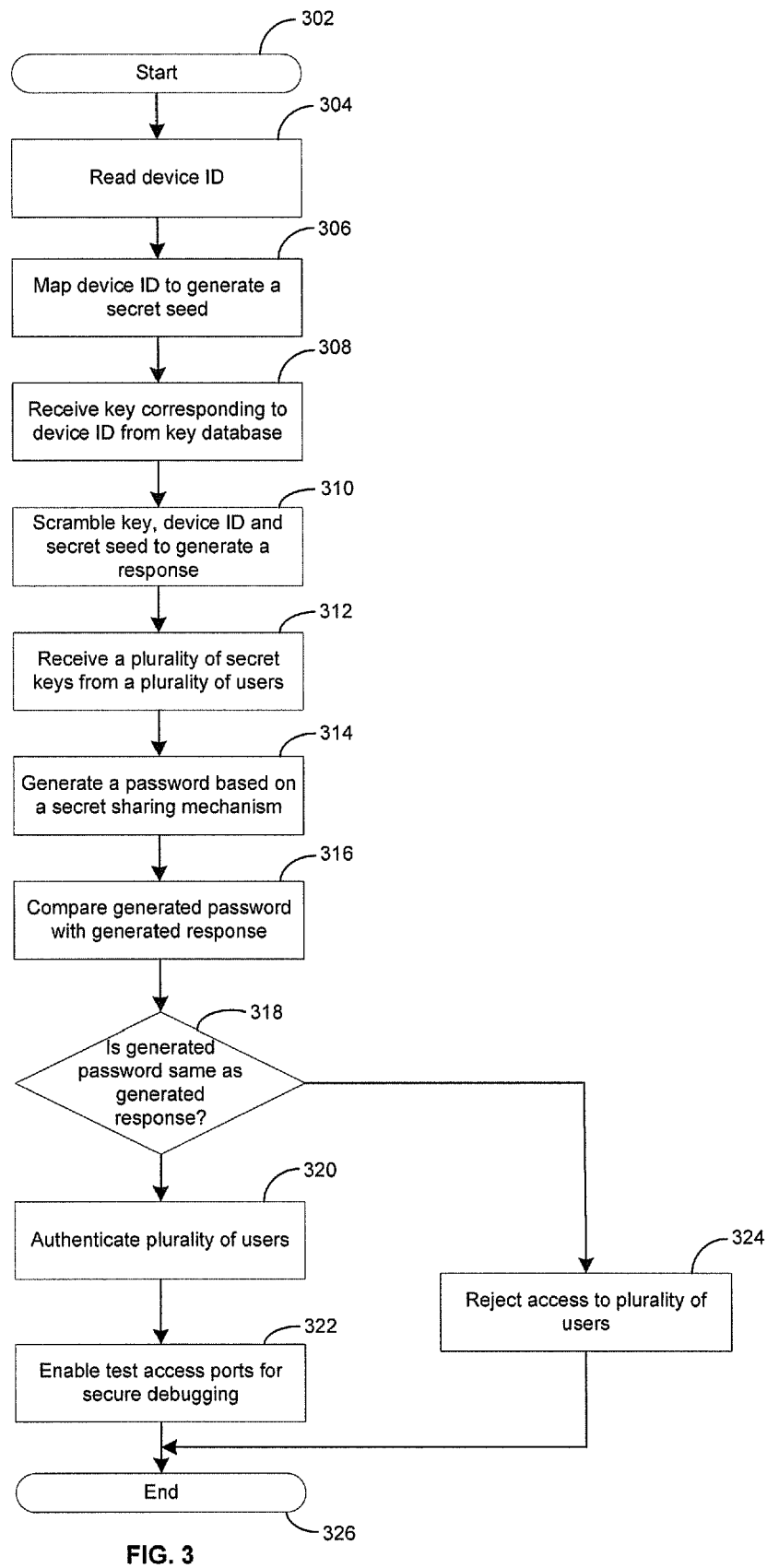
FIG. 3 is a flowchart illustrating a method for using shared secrets to protect the access of testing keys for set-top box, in accordance with an embodiment of the invention.

FIG. 3 is a flowchart illustrating a method for using shared secrets to protect the access of testing keys for set-top box, in accordance with an embodiment of the invention. Referring to FIG. 3, exemplary steps may start at step 302. In step 304, the device ID of the set-top box (STB) may be read. In step 306, the device ID may be mapped to generate a secret seed. In step 308, the key corresponding to the device ID may be received from the key database. In step 310, the key, device ID and the secret seed may be scrambled to generate a response. In step 312, a plurality of secret keys may be received from a plurality of users trying to access the set-top box. In step 314, a password may be generated utilizing a secret sharing mechanism based on the received plurality of secret keys. In step 316, the generated password may be compared with the generated response. In step 318, it may be determined whether the generated password is same as the generated response. In step 318, if the generated password is the same as the generated response, control passes to step 320. In step 320, the plurality of users may be authenticated to access the set-top box. In step 322, the access ports and/or nodes may be enabled for secure debugging based on the authentication. Control passes to end step 326. In step 318, if the generated password is not the same as the generated response, control passes to step 324. In step 324, the plurality of users may be rejected access. Control then passes to end step 326.

In accordance with an embodiment of the invention, a system for secure key authentication may comprise a security processor within a set-top box (STB) 102 (FIG. 1) that receives a plurality of secret keys from a plurality of users. The STB 102 may be adapted to generate a password utilizing secret sharing based on the received plurality of secret keys. The shared secret process block 212 (FIG. 2) may be adapted to receive a plurality of secret keys, for example, secret keys 1 . . . m, if there are m parties that require access to the key database 208. The STB 102 may be adapted to compare the generated password with a generated response. The STB 102 may be adapted to authenticate access to the STB 102 for the plurality of users based on the comparison.

In one embodiment of the invention, the generated response may be generated by scrambling a device identification number (ID) of the STB 102 with its corresponding key. The device ID is unique for a particular STB. The key may be stored in a key database 208. The device ID may be mapped to a value used to generate a secret seed. The STB 102 may be adapted to enable at least one of: test ports and test nodes based on the authentication for secure debugging. The STB 102 may be adapted to authenticate the plurality of users if the generated password matches the generated response. The enable block 116 may be adapted to enable the test modes and test access ports. The STB may be adapted to deny access to the STB 102 by the plurality of users if the generated password fails to match the generated response. If the device ID stored in the device ID block 104 does not match its corresponding unique key stored in the descrambler block 108, authentication may fail and the protection action block 110 may be adapted to take suitable action. The protection action block 110 may be adapted to deny a user from accessing the set-top box 102 if authentication fails.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for authentication, the method comprising:
   in a set-top box:
   generating a password by utilizing secret sharing based on a received plurality of secret keys;
   generating a response by scrambling a device identification number (ID) of said set-top box with its corresponding key and a corresponding secret seed, wherein said corresponding secret seed is generated based on mapping said device ID; and
   authenticating access to said set-top box based on comparing said generated password with said generated response.

2. The method according to claim 1, comprising receiving said plurality of secret keys from a plurality of users attempting to gain access to said set-top box.

3. The method according to claim 2, comprising authenticating access to said set-top box for said plurality of users, if said generated password matches with said generated response.

4. The method according to claim 2, comprising denying access to said set-top box for said plurality of users, if said generated password does not match with said generated response.

5. The method according to claim 1, wherein each said set-top box is associated with a unique said device ID.

6. The method according to claim 1, wherein each said device ID is associated with a unique said corresponding key.

7. The method according to claim 1, comprising storing said corresponding key in a key database.

8. The method according to claim 1, comprising enabling one or both of: test ports and/or test nodes based on said authenticated access for secure debugging of said set-top box.

9. A system for authentication, the system comprising:
   one or more processors and/or circuits for use in a set-top box, said one or more processors and/or circuits being operable to:
   generate a password by utilizing secret sharing based on a received plurality of secret keys;
   generate a response by scrambling a device identification number (ID) of said set-top box with its corresponding key and a corresponding secret seed, wherein said corresponding secret seed is generated based on mapping said device ID; and
   authenticate access to said set-top box based on comparing said generated password with said generated response.

10. The system according to claim 9, wherein said one or more processors and/or circuits are operable to receive said plurality of secret keys from a plurality of users attempting to gain access to said set-top box.

11. The system according to claim 10, wherein said one or more processors and/or circuits are operable to authenticate access to said set-top box for said plurality of users, if said generated password matches with said generated response.

12. The system according to claim 10, wherein said one or more processors and/or circuits are operable to deny access to said set-top box for said plurality of users, if said generated password does not match with said generated response.

13. The system according to claim 9, wherein each said set-top box is associated with a unique said device ID.

14. The system according to claim 9, wherein each said device ID is associated with a unique said corresponding key.

15. The system according to claim 9, wherein said one or more processors and/or circuits are operable to store said corresponding key in a key database.

16. The system according to claim 9, wherein said one or more processors and/or circuits are operable to enable one or both of: test ports and/or test nodes based on said authenticated access for secure debugging of said set-top box.

* * * * *